(12) United States Patent
Kitayoshi

(10) Patent No.: US 9,607,186 B2
(45) Date of Patent: Mar. 28, 2017

(54) RF TAG SYSTEM WHICH ALLOWS A SCHEDULED START RF TAG AND A REMOTE START RF TAG TO SHARE THE SAME FREQUENCY BAND

(71) Applicant: Hitoshi Kitayoshi, Miyagi (JP)

(72) Inventor: Hitoshi Kitayoshi, Miyagi (JP)

( * ) Notice: Subject to any disclaimer, the term of this patent is extended or adjusted under 35 U.S.C. 154(b) by 722 days.

(21) Appl. No.: 13/953,201

(22) Filed: Jul. 29, 2013

(65) Prior Publication Data
US 2013/0314215 A1 Nov. 28, 2013

Related U.S. Application Data

(62) Division of application No. 12/530,225, filed as application No. PCT/JP2008/053871 on Mar. 4, 2008, now Pat. No. 8,559,486.

(30) Foreign Application Priority Data

Mar. 6, 2007 (JP) .................................. 2007-056108

(51) Int. Cl.
G06K 7/10 (2006.01)
G06K 19/077 (2006.01)
H04B 5/02 (2006.01)

(52) U.S. Cl.
CPC ... *G06K 7/10009* (2013.01); *G06K 19/07749* (2013.01); *H04B 5/02* (2013.01)

(58) Field of Classification Search
CPC . G06K 19/07749; G06K 7/10009; H04B 5/02
USPC ..................................................... 340/12.23
See application file for complete search history.

(56) References Cited

U.S. PATENT DOCUMENTS

| 3,876,953 A | * | 4/1975 | Abel .......................... G09B 5/12 327/31 |
| 5,661,757 A | | 8/1997 | Takashi et al. |
| 6,166,932 A | * | 12/2000 | Otoshi ................ H02M 7/4807 363/25 |
| 6,353,406 B1 | * | 3/2002 | Lanzl ....................... G01S 13/84 340/10.1 |
| 6,982,612 B2 | * | 1/2006 | Sakano .................. H01P 1/2135 333/126 |
| 7,495,560 B2 | | 2/2009 | Easton et al. |
| 2004/0155755 A1 | * | 8/2004 | Bui ..................... G06K 19/0723 340/10.51 |
| 2006/0175407 A1 | | 8/2006 | Kinoshita |

(Continued)

FOREIGN PATENT DOCUMENTS

| JP | 7-264091 | 10/1995 |
| JP | 2002-519875 | 7/2002 |

(Continued)

OTHER PUBLICATIONS

International Search Report, PCT/JP2008/053871—Jun. 17, 2008.

*Primary Examiner* — Omer S Khan
(74) *Attorney, Agent, or Firm* — Young & Thompson

(57) ABSTRACT

An RF tag system is provided, in which in addition to a method of easily sending back MPSK modulated sub-carrier signals on the RF tag side, communication protocols and circuit systems for accurately demodulating modulated waves on the RF tag reader side can be implemented, data transmission from an RF tag to an RF tag reader can be realized over a long operating distance at high speed, and an RF tag can be operated for a long lifetime.

1 Claim, 11 Drawing Sheets

(56) References Cited

U.S. PATENT DOCUMENTS

2009/0033462 A1 2/2009 Kitayoshi et al.
2009/0167457 A1* 7/2009 Melde .................... H01P 5/04
333/32

FOREIGN PATENT DOCUMENTS

| | | |
|---|---|---|
| JP | 2005-038037 | 2/2005 |
| JP | 2005-80205 | 3/2005 |
| JP | 2005-278139 | 10/2005 |
| JP | 2006-085573 | 3/2006 |

* cited by examiner

READER SIDE: TRANSMISSION FREQUENCY = 2.45GHz  ANTENNA ACTUAL GAIN = 12 dBi
TRANSMISSION POWER = 23 dBm  TRANSMISSION MODULATION MODE = ASK

TAG SIDE: ANTENNA ACTUAL GAIN = 4.5 dBi
RESPONSE MODULATION MODE = SUB-CARRIER QPSK (4cw-lv2bit)

| DISTANCE (m) | RECEPTION POWER ON TAG SIDE (dBm) | TRANSMISSION RATE RECEIVABLE ON TAG SIDE (kbps) | RESPONSE RECEPTION POWER ON READER SIDE (dBm) | TRANSMISSION RATE RECEIVABLE ON READER SIDE (kbps) | SUB-CARRIER FREQUENCY ON TAG SIDE (kHz) |
|---|---|---|---|---|---|
| 23.1 | -28 | 300 | -88 | 500.0 | 1000.0 |
| 41.1 | -33 | 250 | -98 | 250.0 | 500.0 |
| 73.0 | -38 | 150 | -108 | 31.3 | 62.5 |
| 92.0 | -40 | 50 | -112 | 12.5 | 25.0 |

Fig. 5

RF TAG SYSTEM WHICH ALLOWS A SCHEDULED START RF TAG AND A REMOTE START RF TAG TO SHARE THE SAME FREQUENCY BAND

CROSS REFERENCE TO RELATED APPLICATIONS

This application is a division of application Ser. No. 12/530,225 filed on Sep. 18, 2009, which is a National Stage of PCT/JP2008/053871 filed on Mar. 4, 2008, which claims foreign priority to Japanese Application No. 2007-056108 filed on Mar. 6, 2007. The entire contents of each of the above applications are hereby incorporated by reference.

TECHNICAL FIELD

The present invention relates to an RF tag, an RF tag reader, and an RF tag system having the RF tag and the RF tag reader, and particularly to a wireless read/write system combining different types of tags, which allows a scheduled start semi-passive tag and a remote start semi-passive tag to exist together in the same frequency band, and allows tags to operate for a long lifetime at high-speed data transmission.

BACKGROUND ART

Patent Document 1: JP 2001-006061 A
Patent Document 2: JP 2005-038037 A
Patent Document 3: Abstract of the 2006 IEICE General Conference (CBS-1-6 UHF Band RF Circuits for RF tag with Battery Supply, March 2006)

In recent years, in order to realize safe, worry-free, convenient society in which everyone is able to connect to computer networks everywhere with users unaware of them in particular based on providing information, search, and integration analysis as ubiquitous networks, ubiquitous services, or the sensor fusion, it is considered that it is necessary to improve environment in which various types of sensor tags and functional tags of long lifetime and connectable at radio frequencies can be provided and used as infrastructure.

When this is to be carried out, in the field of wireless connection techniques, in order to read a large number of tags, it is essential that tags operate in a long range and transmit data at high speed. In consideration of operation for a long lifetime, a scheduled start semi-passive tag and a remote start semi-passive tag are preferably used.

The scheduled start semi-passive tag is operated by such a scheme that the scheduled start semi-passive tag is generally in the wait state for a timer with a small power consumption in order to reduce the consumption of an internal battery for startup for regular reception and response operations. However, the tag has a drawback of a poor real time responsiveness.

On the other hand, the remote start semi-passive tag is operated by such a scheme that a power supply is generally in the off state in order to similarly reduce the consumption of an internal battery for startup, and only when RF power is fed from the RF tag reader side, the power feed is used for remote startup (the power supply is turned on). However, although real time responsiveness is excellent, the remote start semi-passive tag has such drawbacks that when the remote start semi-passive tag exists together with a different system (a wireless LAN, a scheduled start semi-passive tag reader, and the like) in the same frequency band, the remote start semi-passive tag repeats unnecessary remote startup in connection with system startup of these systems and accelerates the consumption of the internal battery (for example, see Patent Documents 1 and 2).

Then, in an environment in which wireless LANs, scheduled start semi-passive tag readers, remote start semi-passive tag readers, passive tag readers, and the like exist together for use in the same frequency band, such a remote start semi-passive tag is desired that the consumption of the internal battery can be reduced, even in the state in which any of these systems are used at the same time. In addition, it is desired to realize a radio communication scheme of high transmission rates and various combinations of sensor tag systems and ubiquitous services.

On the other hand, as an RF tag before, as shown in FIG. 1(A) (for example, see Patent Document 3), a normal reception selector switch 3 connected to an input (Pin) 1 through a transmission modulating circuit 2 is connected to a wakeup detecting circuit 4 having a matching circuit 4a and a DC detecting circuit 4b, and the output voltage of the DC detecting circuit 4b is read by a wakeup side A/D converter 5, whereby the presence of RF power feed from an RF tag reader, not shown, is monitored. When RF power feed from the RF tag reader is made, the reception selector switch 3 is switched and connected to the ASK modulated wave reception circuit 6 side, a command sent from the RF tag reader is modulated, the command is read by an ASK modulated wave reception circuit side A/D converter 7 and analyzed by a digital signal processing circuit 8, and a response signal is sent back by repeatedly turning on and off a transmission switch 2a of the transmission modulating circuit 2.

In addition, for the DC detecting circuit 4b used here, as shown in FIG. 1(B), an eight-stage stacked diode detecting circuit is used. In addition, an ASK modulated wave reception circuit 6 has a matching circuit 6a, a reception detecting circuit 6b, a limiter 6c, and an operational amplifier 6d.

In this startup scheme, because it is necessary to operate the wakeup side A/D converter 5 all the time even though there is no response request from the RF tag reader (RF power feed from the RF tag reader), it is considered that an internal battery (not shown) is consumed soon.

In addition, because the output voltage of the wakeup detecting circuit 4 outputs one volt (load resistance 1 MΩ) at an RF input power of −15.3 dBm, it is assumed that this output is easily used to conduct on/off control of a switch (not shown) for power feed for the entire tag circuitry.

DISCLOSURE OF THE PRESENT INVENTION

Problems that the Present Invention is to Solve

However, these various RF tags and RF tag systems described above have drawbacks described below.

(1) In the stacked diode detecting circuit, an increase in output impedance caused by growing a voltage rise ratio (the number of stages of the diode) is significantly large, and the effects of a CR time constant cause no reception of data at high speed. For example, in the case of the above-described DC detecting circuit, the eight-fold voltage multiplier-rectifier circuit as shown in FIG. 1(B), the output impedance in a conventional scheme is about 200 kΩ.

Then, suppose that the output impedance of a voltage multiplying-rectifying scheme by a resonant stub according to the present invention is about 5 kΩ and this is used for an ASK demodulator of the same sensitivity and the same capacitive load. In this case, high-speed data reception about 40 times the described above scheme is made possible to realize high-speed data transmission from an RF tag reader to an RF tag.

(2) In the invention disclosed in Patent Document 1 described above, the wakeup circuit described above has such drawbacks that because the wakeup circuit is capable of monitoring only the presence of electromagnetically induced power feed, the wakeup circuit repeats wakeup operations every time when a different system externally feeds power, and the consumption of the internal battery is accelerated, which is caused by repeatedly activating an unnecessary power supply.

In addition, in the invention disclosed in Patent Document 2 described above, such a technique is disclosed that the technique is related to a resonant voltage rise method of a wakeup circuit for high sensitivity. A circuit for monitoring the start of communications disclosed in Patent Document 2 has an energy trap antenna, a coil, two condensers, two resistors, a diode, and a Zener diode, in which the coil and one of the condensers arranged in parallel with each other produce parallel resonance with the energy trap antenna, and the open circuit voltage of the energy trap antenna is applied to one of the resisters, whereby voltage is not boosted (only tuning effect is available), and the coil and one of the condensers produce series resonance to boost voltage to the resister when the energy trap antenna is removed and the coil is used as an antenna.

Then, a system of using such an energy trap antenna is adopted to allow control in a range of about 7.5 m, even tough a current of one ampere is carried through a radiator having a diameter of 3 m.

In contrast to this, in the present invention, a specific function is provided, which allows control in the same degree as the descriptions above by transmitting an electromagnetic wave of about 300 mW from a planner antenna of about 20 cm×20 cm square in the 2.45 GHz band, and which monitors external power feed patterns in order to avoid unnecessary wakeup operations. For example, in a method of implementing control only with external power feed, as commercially available passive RF tags, tags operated in compliance with the ARIB STD-T66 standard (operated in compliance with the former standard) in the 2.45 GHz band have an operating distance of about one meter, and tags operated in compliance with the ARIB STD-T89 standard (operated in compliance with the latter standard) in the 900 MHz band have an operating distance of about five meters. In contrast to this, it is an object to provide an RF tag system in which a pulse code key detecting circuit according to the present invention is used to provide along operating distance only with external power feed because of a reduction in power consumption and an effect of boosting reception voltage such that the operating distance is about five meters according to the former standard and the operating distance is about 30 meters according to the latter standard.

In addition, particularly in the present invention, it is an object of the present invention to provide a method of receiving an RF tag and detecting an ID, in which in an environment in which tags exist together with other systems (wireless LANs and tag readers according to different schemes), the average current consumption on the RF tag side is as small as about 2 microamperes, and the operating distance is as long as about 90 meters.

(3) In the RF tag shown in FIG. 1, in order to generate a return signal, the transmission switch 2a is turned on and off to directly superimpose bit string information on ASK modulated waves. Therefore, as shown in FIG. 2(A), in a demodulation method of a response signal from an RF tag T, the tag response signal can be easily demodulated as changes in strength by $(I^2(t)+Q^2(t))$, whereas a problem arises that the frequency of occurrence of reception error is high because the received spectrum of a reflector S other than the RF tag T is laid on the tag response spectrum (the shaded area in a graph shown in FIG. 2(B)).

In addition, such a method can be easily considered that the tag side response signal is superimposed on the phase of the sub-carrier ωs. However, a new problem arises that it is difficult to demodulate the response signal from the I(t) and Q(t) signals. In addition, such a method can be considered to use MPSK modulation mode generalized to BPSK modulation or to QPS modulation as the modulation mode of higher information transmission efficiency with a constant power for sending back signals. However, the tag response signal is superimposed on the phase of the sub-carrier ωs, and demodulation becomes more difficult because the orthogonality of the I(t) signal and the signal Q(t) or phase reference have to be detected.

Then, in the present invention, in addition to a method of easily sending back MPSK modulated sub-carrier signals on the RF tag side, communication protocols and circuit systems for accurately demodulating modulated waves on the RF tag reader side can be implemented, and high-speed data transmission from an RF tag to an RF tag reader can be realized.

Means for Solving the Problems

In an RF tag system according to the present invention, on the RF tag side, a resonant voltage multiplier circuit and a pulse code key detecting circuit are used, and on the RF tag reader side, a quadruple sampling DFT circuit having a compensation circuit for quadrature down-conversion is used, whereby a wireless read/write system combining different types of tags can be provided, which allows a scheduled start tag and a remote start tag to exist together in the same frequency band, and allows high-speed data transmission. In addition, the RF tag is not limited in particular, including a passive type, a semi-passive type, an active type, and the like.

In addition, in an RF tag system according to the present invention, in the resonant voltage multiplier circuit, power is fed to a resonator showing inductive impedance of a high Q value at a constant frequency through a micro-capacitance having Cf=1 pF·GHz or below, whereby a high voltage rise ratio can be obtained even in a GHz high frequency band. Although a capacitive load is drawn from the connecting point between the resonator and the power feed system micro-capacitance to cause a slight change in the resonance frequency, such a resonant voltage multiplier circuit can be formed that a reduction in the voltage rise ratio caused by the load is very small. At this time, for the resonator, in addition to a λg/4 short stub, a coaxial dielectric resonator or a cavity resonator can be used.

Moreover, in an RF tag system according to the present invention, the pulse code key detecting circuit is operated depending on input signals. More specifically, a pulse width detecting circuit is used, in which at least two sets of time constant circuits for charge and discharge, two sets of comparators connected to the time constant circuits, and an AND of an input signal and outputs of these two sets of the comparators determine whether the input pulse width is within a certain range. In addition, for the AND at this time, a logical NOT circuit may be used as the comparator.

In addition, in an RF tag system according to the present invention, in the pulse code key detecting circuit, a sequential logical circuit may be configured by combining two sets or more of pulse width detecting circuits, logic holding circuits, and time constant circuits, having at least different ranges of detecting a pulse width, and a pulse train key may be detected, which is configured of two sets or more of pulse widths.

In addition, in an RF tag system according to the present invention, a quadruple sampling DFT circuit is used as the compensation circuit for quadrature down-conversion of the RF tag reader, in which the quadruple sampling DFT circuit scales and rotates any one of a signal I(t) and a signal Q(t) in the fs frequency band for sub-carrier quadrature detection, whereby precise MPSK demodulation can be conducted. Therefore, high-speed data transmission from the tag to the reader can be realized. In addition, the operations of scaling and rotation may be conducted before or after DFT processing. Such a scheme may be possible that scaling and rotation are separately conducted before and after DFT processing, or conducted for the I(t) signal and for the signal Q(t).

In addition, in an RF tag system according to the present invention, MPSK modulation response from the RF tag to the RF tag reader is made by repeating packet response for a relatively short time having a sub-carrier signal fs suspension interval and a 0° reference phase interval, whereby the reference phase correction of the sub-carrier fs can be conducted for each packet as well as a response signal from an RF tag moving at relatively high speed can be subjected to highly accurate MPSK demodulation.

In addition, in an RF tag system according to the present invention, generating an MPSK modulated response signal from the RF tag to the RF tag reader is implemented by repeatedly calling a subroutine that outputs a few cycles of rectangular waves having a different phase corresponding to a response data bit string of a control circuit. Thus, subroutines for different sub-carrier frequencies fs and subroutines having different cycle numbers of generating fs rectangular waves are prepared, whereby the transmission bit rate of the response signal can be relatively easily changed depending on commands from the RF tag reader side.

Here, for example, in the case of 8-ary PSK modulation, output subroutines are called as 0°→000, 45°→001, 90°→010, 135°→011, 180°→100, 225°→101, 270°→110, and 315°→111.

In addition, in an RF tag system according to the present invention, in the RF tag system, a command for specifying a transmission bit rate of a response signal for the RF tag is sent in accordance with a reception situation (reception situations of the level or error detection) on the RF tag reader side, and on the RF tag side, the bit rate of the response signal is selected. Thus, the sampling clock frequency 4fs can be changed also on the RF tag reader side, or the DFT integration cycle number M is changed, whereby the tag response MPSK modulated signal can be easily demodulated, and measures can be taken against such an event that the transmission bit rate of the tag response signal that can be received and demodulated on the RF tag reader side is greatly changed depending on the distance between the RF tag reader and the RF tag.

In addition to this, in an RF tag system according to the present invention, in a demodulation circuit for specifying a command and an ID from the RF tag reader and for receiving write data, the demodulation circuit includes a receiver circuit having a level comparator (comparator) that highly sensitively detects the presence of a tag antenna received RF signal induced in the resonant voltage multiplier circuit for ASK demodulation, from a difference between a voltage generated from a slightly forward-biased diode driven by capacitive coupling with an output of the resonant voltage multiplier circuit and a voltage generated from a slightly forward-biased diode having the same characteristic thereof and insulated from the output of the resonant voltage multiplier circuit.

Advantage of the Present Invention

In addition to a method of easily sending back MPSK modulated sub-carrier signals on the RF tag side, the RF tag system according to the present invention can implement communication protocols and circuit systems for accurately demodulating modulated waves on the RF tag reader side, and can realize high-speed data transmission from an RF tag to an RF tag reader.

BRIEF DESCRIPTION OF THE DRAWINGS

FIG. 5 shows an embodiment of the RF tag system according to the present invention, which depicts the experiment evaluation results of system performance in read/write operations of the scheduled start semi-passive RF tag;

Figure 1:
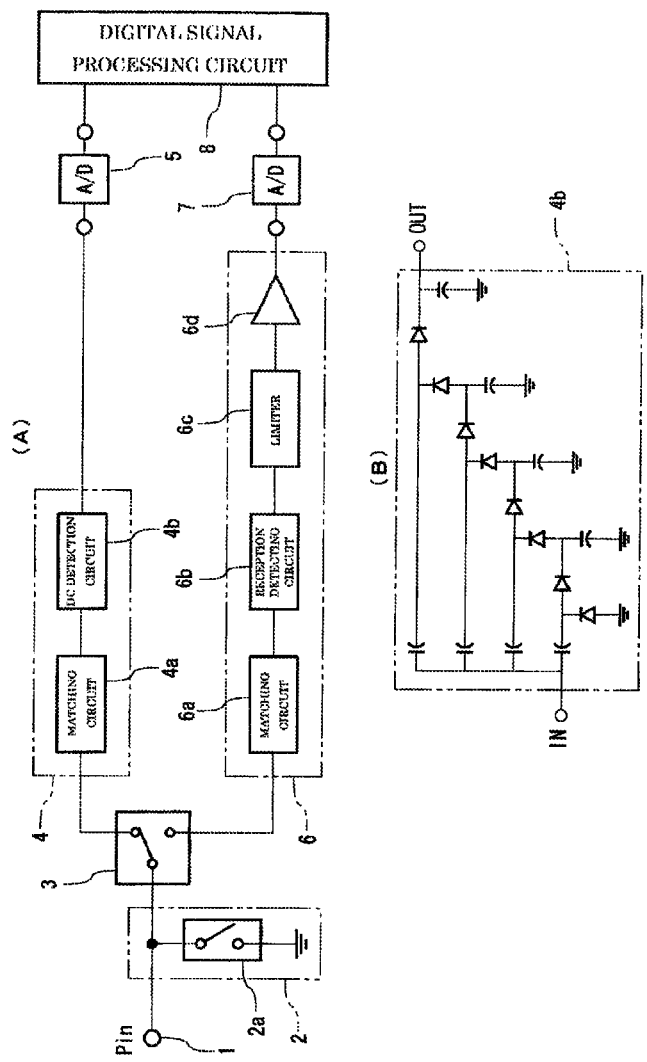
FIG. 1 shows a battery-driven electronic RF tag before, (A) is a circuit diagram depicting the RF tag, and (B) is a circuit diagram depicting a detecting circuit.
Figure 2:
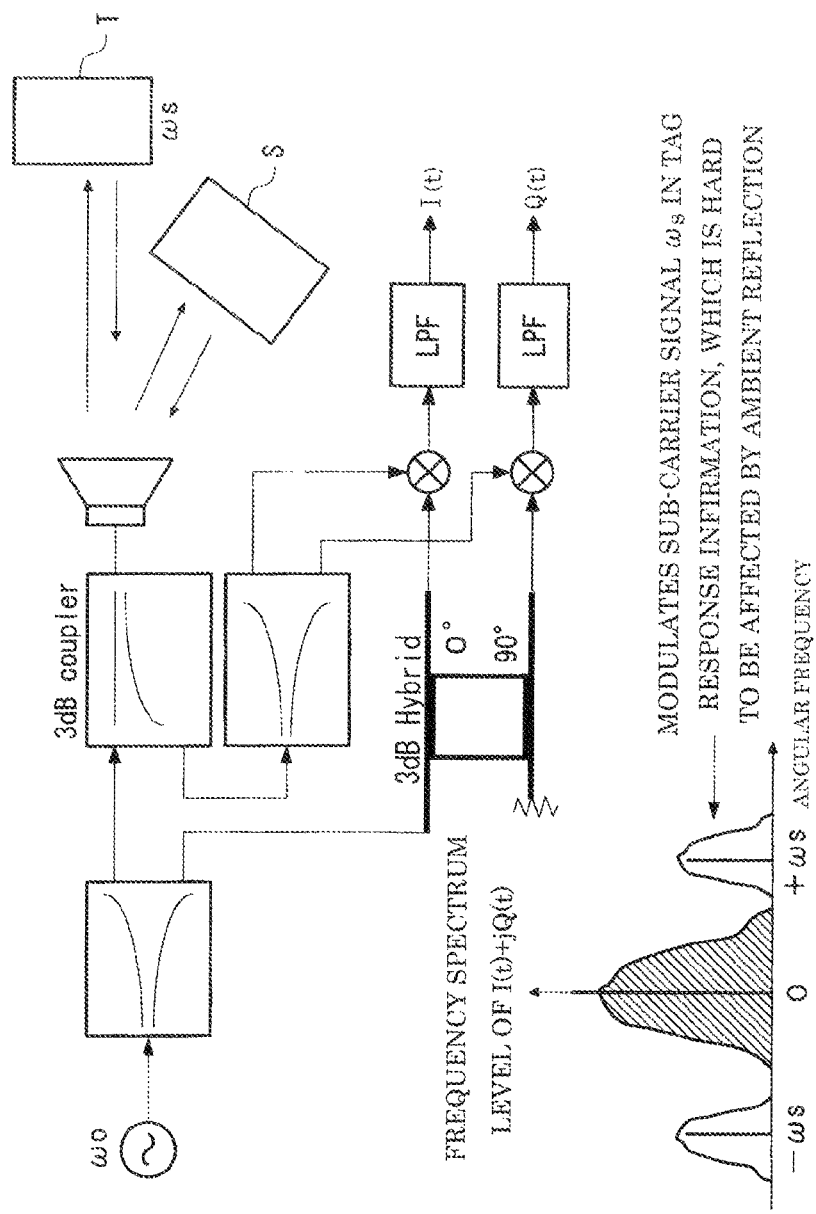
FIG. 2 is a circuit diagram depicting response signal demodulation in the RF tag before.

DESCRIPTION OF REFERENCE NUMERALS AND SIGNS 1 input (Pin)
2 transmission modulating circuit
2a transmission switch
3 reception selector switch
4 wakeup detecting circuit
4a matching circuit
4b DC detection circuit
5 wakeup side A/D converter
6 ASK modulated wave reception circuit
6a matching circuit
6b reception detecting circuit
6c limiter
6d operational amplifier
7 ASK modulated wave reception circuit side A/D converter
8 digital signal processing circuit
20 scheduled start semi-passive RF tag
21 internal battery such as a small-sized button battery
22 RF tag antenna
23 resonant stub voltage multiplier circuit
24 control circuit
25 built-in timer
26 ASK demodulation circuit
27 stub
30 remote start semi-passive RF tag
31 internal battery such as a small-sized button battery
32 RF tag antenna
33 resonant stub voltage multiplier-rectifier circuit
34 pulse code key detecting circuit
35 control circuit
36 stub
40 RF tag reader
41 oscillator
42 pulse modulator
43 bandpass filter
44 power amplifier
45 antenna (used both for transmission and reception)
46 directional coupler (circulator or hybrid circuit)
47 bandpass filter
48 low noise amplifier
49 mixer
50 mixer
51 90° phase shifter
52 LPF
53 LPF
54 compensation circuit for quadrature down-conversion
55 sampling frequency generating circuit (quadruple sampling DFT processing clock circuit)
56 AD converter
57 AD converter
58 complex DFT processing circuit for frequency component of fs
59 strength and phase detector
60 MPSK demodulation circuit
61, 62 k-fold circuit
63 to 66 multiplication circuit
71 antenna
72 resonant stub voltage multiplier circuit
73 rectifier circuit
74 pulse code key detecting circuit
75 Cockcroft-Walton voltage multiplier-rectifier circuit
76 control circuit
81 internal battery
82 ASK demodulation circuit
83 pulse code key detecting circuit
84 Rx antenna
85 resonant stub voltage multiplier circuit
86 control circuit
87 oscillator
88 modulator
89 amplifier
90 Tx antenna

BEST MODE FOR CARRYING OUT THE PRESENT INVENTION

Next, an RF tag system according to an embodiment of the present invention will be described with reference to the drawings.

Figure 3:
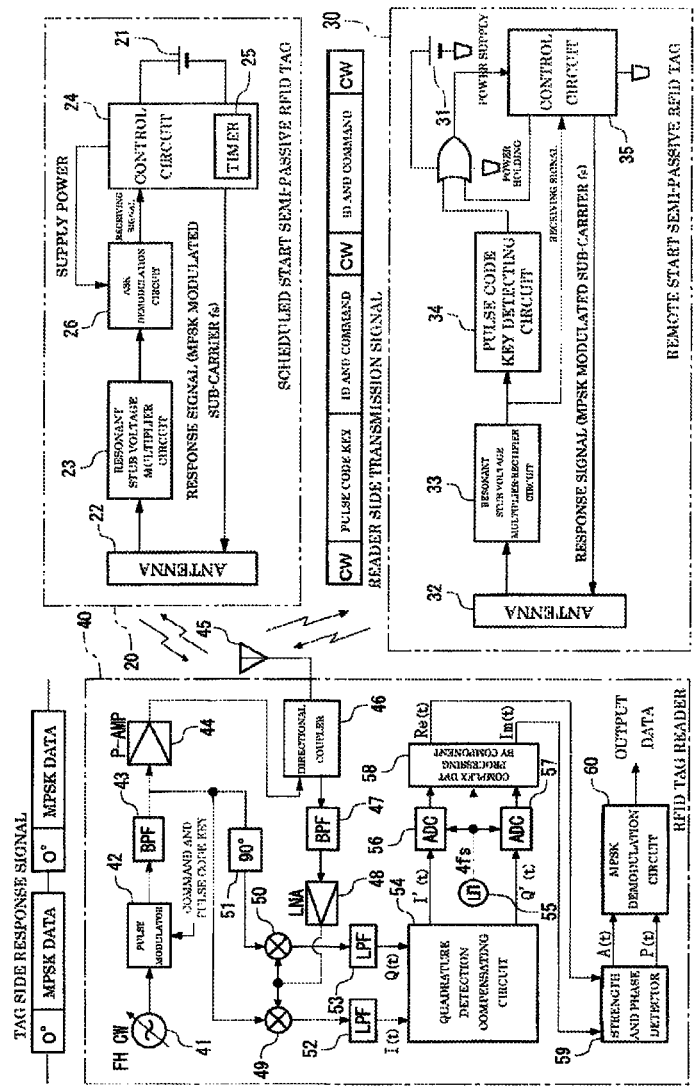
FIG. 3 is a system circuit diagram depicting an embodiment of an RF tag system according to the present invention.

FIG. 3 shows a basic configuration of an RF tag system according to an embodiment of the present invention.

In the RF tag system, in an environment in which a scheduled start semi-passive RF tag 20 that is suited for long distance communications and has poor real time responsiveness and a remote start semi-passive RF tag 30 that has a relatively short distance for communications and has an excellent real time responsiveness exist together, an RF tag reader 40 is provided, which can read and write both of the RF tags 20 and 30.

For the RF tag reader 40 in the RF tag system, such an RF tag reader is used, which is a specified low power radio station and is operated in compliance with the ARIB STD-T66 standard (in the 2.45 GHz band, transmission power is 23 dBm, and antenna actual gain is 12 dBi), in which relatively long distance communications are allowed such that the read/write communication distance for the scheduled start semi-passive RF tag 20 is a few tens meters and the read/write communication distance for the remote start semi-passive RF tag 30 is a few meters. The RF tags 20 and 30 can be prepared in the size about 55×25×4 mm, a data transmission rate of about 300 Kbps is satisfied for read/write, and a few year lifetime is satisfied with installation of internal batteries such as a small-sized button batteries 21 and 31 in the RF tags 20 and 30 even though other communication systems such as a wireless LAN exist in the same frequency band.

Hereinafter, the general outlines of the operations of the RF tag system shown in FIG. 3 will be described. In addition, the circuit configuration and the detailed operation for each of functional blocks will be described later.

In the RF tag reader 40, an oscillator source 41, a pulse modulator 42, a bandpass filter 43, and a power amplifier 44 generate a CW signal as a carrier signal according to frequency hopping mode, and the CW signal is modulated into pulse ASK modulation data, and sent from an antenna 45.

As data format shown between the RF tags 20 and 30 shown in FIG. 3, pulse ASK modulation data includes CW (unmodulated waves) for waiting for response from the RF tags 20 and 30, a pulse code key (a particular pulse train to be a key) for starting the remote start semi-passive RF tag 30, all or a part of ID code for the RF tags 20 and 30 to identify and specify an RF tag on the other end of communications, and a command and write information for the identified and specified RF tag. In addition, the term "to identify" here means operations of finding the presence of the RF tags 20 and 30.

In the scheduled start semi-passive RF tag 20, an RF signal from the RF tag reader 40 is received by the RF tag antenna 22, and the impedance is converted in a resonant stub voltage multiplier circuit 23, and the voltage is boosted about ten times as the RF signal remains in an RF signal. A microprocessor (μ-CPU) as a control circuit 24 incorporated in the RF tag 20 feeds power to an ASK demodulation circuit 26 according to a built-in timer 25 for every fixed period of time, and subjects the received RF signal whose voltage is boosted to ASK demodulation.

The ASK demodulated ID specification code and a command from the RF tag reader 40 are analyzed by the microprocessor, a necessary response signal is combined by the microprocessor, and a variable impedance device (varactor diode, and the like) mounted on the antenna 45 is driven to modulate and send back a CW carrier signal from the RF tag reader 40.

Here, the response signal combined by the control circuit 24 is an MPSK modulated wave at a frequency fs, which is characterized in that a relatively short packet form (about 100 microseconds) is configured, which is necessary to include the output off state and the reference phase 0° output for a fixed period of time before data is sent back, and return data is generated and split into a plurality of packets.

In the RF tag 20, because an amplifier can be used for the ASK demodulation circuit 26, a high reception sensitivity can be obtained. Although the RF tag 20 can be operated over long distance communications, such a sequence is necessary to repeat timer wait and reception check operations in order to reduce the consumption of an internal battery 21, which causes a drawback that real time response performance is sacrificed.

In the remote start semi-passive RF tag 30, the RF signal from the RF tag reader 40 is received by an RF tag antenna 32, the RF signal is subjected to voltage boost and to ASK demodulation in a stub resonance voltage multiplier-rectifier circuit 33, a remote start key is checked by a pulse code key detecting circuit 34 that takes the signal as power feed for operation, and a signal is outputted to feed power to a control circuit 35, only when the remote start key is matched with a unique key of the RF tag 30.

The control circuit 35 once fed with power turns on a power feed holding output in order to maintain its power feed, the control circuit 35 continuously operates to analyze the ASK demodulated signal received from the stub resonance voltage multiplier-rectifier circuit 33 even though the output of the pulse code key detecting circuit 34 is not available, and the control circuit 35 combines a necessary response signal, and supplies it to the RF tag antenna 32. A method of sending back the response signal is the same as that of the scheduled start semi-passive RF tag. After the control circuit ends sending back the response signal, the control circuit turns off the power feed holding output to stop power feed, or the control circuit selects the timer wait state.

The pulse code key detecting circuit 34 is a circuit that detects input pulse width and order. Because the pulse code key detecting circuit 34 is operated only by the RF signal received by the RF tag antenna 32, the pulse code key detecting circuit 34 has a poorer sensitivity than that of the scheduled start semi-passive RF tag 20, and has a drawback that the communication distance is short.

In addition, the pulse code key detecting circuit 34 and its detailed operation will be described later.

On the other hand, in the RF tag reader 40, the return signals from the RF tags 20 and 30 are received by an antenna (used both for transmission and reception) 45, the received signals are selected by a directional coupler (circulator or hybrid circuit) 46, a bandpass filter 47, and a low noise amplifier 48, and the received signals are mixed with transmission signals in mixers 49 and 50 to obtain I and Q detection signals.

The I and Q detection signals have error in gain balance or orthogonality caused by a phase shift of a 90° phase shifter 51 or caused by the characteristics of the mixers 49 and 50. The I and Q signals are passed through LPFs 52 and 53, and removed of high-frequency components. A compensation circuit for quadrature down-conversion 54 corrects the gain balance or orthogonality of the I and Q signals. A sampling frequency four times an RF tag response signal sub-carrier component frequency fs outputted from a sampling frequency generating circuit 55 is used to subject the I and Q signals to AD conversion in AD converters 56 and 57, and the I and Q signals are processed in an frequency component of fs by complex DFT processing circuit 58.

Re(t) and Im(t) subjected to DFT processing are computed into the strength $A(t)=Re^2(t)+Im^2(t)$ and the phase $P(t)=tan^{-1}(Im(t)/Re(t))$ by a strength and phase detector 59.

The mean value of P(t) in the interval from the rising edge of the strength A(t) to tag response 0° output interval is Po, and MPSK demodulation data is obtained from P(t)−Po in the tag response MPSK data interval by an MPSK demodulation circuit 60.

In this scheme, the response signal from the RF tag that is moving at relatively high speed can be subjected to MPSK demodulation as well as the gain balance or orthogonality of the I and Q detecting circuits, which are difficult to be adjusted in the high-frequency band, can be corrected at fs (low frequency). Thus, highly accurate phase detection (MPSK demodulation) is made possible.

Next, specific circuit configurations and detailed operations for implementing the present invention will be described.

Figure 4:
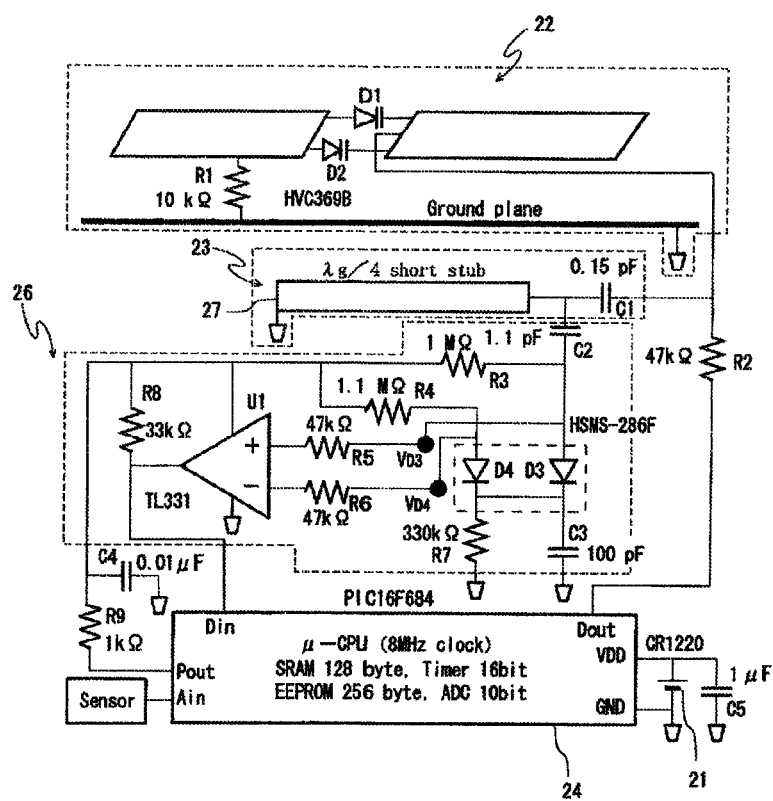
FIG. 4 shows an embodiment of the RF tag system according to the present invention, which is a circuit diagram depicting a specific example of a scheduled start semi-passive RF tag.

FIG. 4 shows an exemplary circuitry of the scheduled start semi-passive RF tag according to the present invention. The RF tag can be incorporated in the size about 55×25×4 mm in the 2.45 GHz band, in which an RF tag reader operated in compliance with the ARIB STD-T66 standard can read and write the RF tag over a distance of 90 meters or longer, and a small-sized button battery CR1220 (3 V, 35 mAh) is used for the internal battery 21 to realize operating life for about two years for continuous use, even though the RF tag is operated for checking response of the RF tag reader for three times per second.

In the circuitry of the scheduled start semi-passive RF tag shown in FIG. 4, the antenna 22 is a divided microstrip antenna mounted with varactor diodes D1 and D2 for use both in reception and response, and the actual gain is about 4.5 dBi. RF power in 2.45 GHz band from the RF tag reader 40 is received between one terminal of the antenna 22 and a ground plane, and the voltage of the RF power is boosted in the resonant stub voltage multiplier circuit 23 using a stub (λg/4 short stub) 27 and a micro-capacitance condenser C1.

The circuitry of the scheduled start semi-passive RF tag is a tank circuit that resonates the inductive impedance of the stub 27 indicating the high Q value and capacitive impedance from micro-capacitance, in which the voltage step-up ratio about ten times can be obtained by 50 ohm feed in the 2.45 GHz band. In addition, the load impedance of the circuitry of the scheduled start semi-passive RF tag is a series circuit formed of a condenser C2 and a Schottky barrier diode D3, and the load is capacitive impedance. However, the capacitive load impedance exerts such an effect that the resonance frequency of the stub 27 is slightly dropped, and has an advantage that the voltage step-up ratio of the circuitry of the scheduled start semi-passive RF tag is rarely affected.

The control circuit 24 is usually fed with power from the internal battery 21. In order to reduce the consumption of the internal battery 21, after a sleep for about 330 milliseconds in average, power is fed from a Pout of the control circuit 24 to the ASK demodulation circuit 26 through a resistor R9 for about 300 microseconds to repeat the operation of checking a response request signal Din from the RF tag reader 40. The current consumptions of the control circuit 24 and the ASK demodulation circuit 26 in operation are 330 microamperes and 580 microamperes, respectively, and the current consumption of the control circuit 24 in a timer wait sleep is as small as about one microamperes. The average current feed from the internal battery 21 in the repeating operation described above is about two microamperes, and the RFID tag can be continuously operated for about two years, which is calculated from a capacity of 35 mAh. In addition, when a coin battery (for example, CR2320 (φ23.0×2 mm)), slightly larger than the internal battery 21, is used for the internal battery 21, the lifetime according to calculations is about seven years because the battery capacity is 130 mAh.

The operation of the ASK demodulation circuit 26 will be described with reference to the circuit diagram depicting the scheduled start semi-passive RF tag shown in FIG. 4. The resistor R9 is inserted for the purpose of limiting power feed current from the Pout of the control circuit 24, and a condenser C4 is inserted for the purpose of stabilizing the power supply voltage of the ASK demodulation circuit 26. To the Schottky barrier diode D3 to which the received voltage boosted RF signal is supplied through the condenser C2 and to the Schottky barrier diode D4 having the same characteristics, the forward bias current is applied through resistors R3 and R4. However, because of R3<R4, when the supply of the received voltage boosted RF signal is not available through the condenser C2, VD3>VD4 is held where the voltage of the anode terminal of the Schottky barrier diode D3 is VD3, and the voltage of the anode terminal of the Schottky barrier diode D4 is VD4. Then, the output of a comparator V1 is turned to high level.

In addition, a resistor R8 is inserted for the purpose of pulling up the comparator output (open collector), a resistor R5 is inserted for the purpose of weakening high-frequency coupling between the RF signal supplied to the Schottky barrier diode D3 and an input terminal of a comparator U1, and a resistor R6 is inserted such that the other input terminal of the comparator U1 is operated under the same condition.

A resistor R7 and a condenser C3 connected to the cathode terminals of the Schottky barrier diodes D3 and D4 are inserted for the purpose of obtaining the offset voltage common in VD3 and VD4, and this is because the input voltage tolerance of the comparator U1 is restricted to around one-half of the power supply voltage of the comparator U1. Here, when the received voltage boosted RF signal is supplied to the Schottky barrier diode D3 through the condenser C2, VD3<VD4 is held, and the output level of the comparator U1 becomes low. In addition, an output terminal of the comparator U1 is connected to a Din of the control circuit 24, and the transmission signal from the RF tag reader 40 is subjected to ASK demodulation in the ASK demodulation circuit 26, and then received and analyzed in the control circuit 24 according to negative logic (high level with no signals, whereas low level with signals).

FIG. 5 shows the results that evaluate the transmittable bit rate between the RF tag 20 and the RF tag reader 40 shown in FIG. 4 as the distance between the RF tag 20 and the RF tag reader 40 is a parameter.

As apparent from the drawing, when an RF tag 20 is detected as all of RF tags 20 are targets within the range of about 90 meters from the RF tag reader 40 side, it is necessary to send an ID search command of the RF tag 20 from the RF tag reader 40 side at the bit rate below the lowest value (50 Kbps) of the transmission rate receivable on the RF tag 20 side.

In all the RF tags 20 (30) received this command, when one finds that it is not a target for ID search (ID search is conducted such that command transmission and response reception are conducted for multiple times as an RF tag ID bit string is split from the higher-order bytes to the lower-order bytes), this RF tag goes into sleep mode for a fixed period of time (for example, a few seconds) and does not check received data.

In addition, when one finds that it is a target for ID search, the unmodulated sub-carrier fs of the bit rate having the lowest value (12.5 Kbps) of the response transmission rate receivable on the RF tag reader 40 side is outputted as response in a time slot corresponding to this RF tag's ID code of the most significant byte not specified.

For example, when the search command specifies the most significant byte 8, ID code 86XX outputs response in the sixth time slot, and ID code 83XX outputs response in the third time slot. Then, when search specification goes to 86, ID code 867X outputs response in the seventh time slot, and ID code 869X outputs response in the ninth time slot.

On the RF tag reader 40 side, DFT detection is conducted at fs=25 kHz, the presence of the RF tag 20 is checked and the lower-order byte is estimated. However, in the midway of ID search, because it is considered that collision occurs between the same specified byte ID code, a lower-order byte specified search command is in turn sent and RF tag response is checked. Finally, after response is obtained from a single RF tag 20 to finish ID detection, the transmission rate receivable on the RF tag 20 side and the transmission rate receivable on the RF tag reader 40 side are determined from the response DFT detection level of the RF tag 20, and these conditions are sent to the RF tag 20 side. After that, the RF tag 20 and the RF tag reader communicate with each other at the specified transmission rate for data read out of the RF tag 20 and data write to the RF tag 20. In data transmission from the RF tag 20 to the RF tag reader 40, as discussed above, packet communications are conducted with MPSK modulated waves at the sub-carrier frequency fs including the output off state and the reference phase 0° output period for a fixed period of time. In addition, for MPSK modulation of the sub-carrier frequency fs, in the control circuit 24, such a subroutine program is prepared, which has a plurality of phases and generates square wave signals corresponding to the frequency fs, and fs square wave generating subroutines having the phases corresponding to data bit strings are in turn executed for output from a Dout of the control circuit 24.

The search method of the RF tag IDs shown here is the method in which the lower-order byte is in turn determined in byte units, as started from the higher-order byte of ID code. However, search may be conducted in inverse order, or may be conducted in unit of a given number of bits, not search in byte units. In addition, when the ID code of the RF tag 20 to be specified is already known, all bits may be collectively specified in sending a search command.

In addition, a resistor R1 shown in FIG. 4 applies the ground potential to the anode terminals of the varactor diodes D1 and D2 for the sub-carrier signal fs, and a resistor R2 applies the reverse bias voltage caused from the sub-carrier signal fs to the cathode terminals of the varactor diodes D1 and D2, whereby the resonance frequency of the antenna is changed, and reflected response waves are given with respect to the transmission waves from the RF tag reader.

In addition, because the output resistance of the internal battery 21 is relatively large, a condenser C5 is inserted for the purpose of suppressing changes in the power supply voltage of the control circuit 24 caused by changes in the load current.

Figure 6:
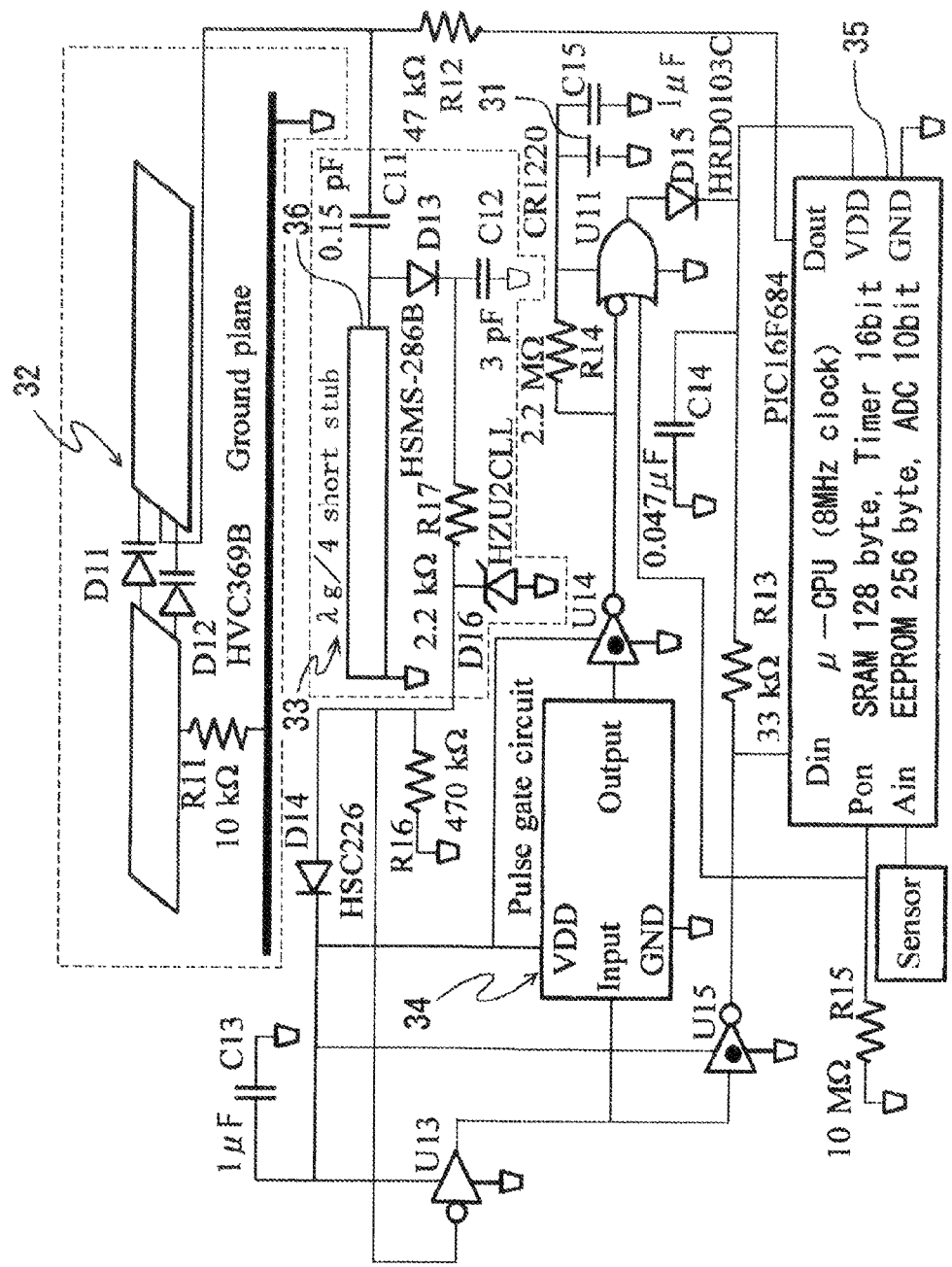
FIG. 6 shows an embodiment of the RF tag system according to the present invention, which is a circuit diagram depicting a specific example of a remote start semi-passive RF tag.

FIG. 6 is an exemplary circuitry of the remote start semi-passive RF tag according to the present invention. The RF tag can be incorporated in the size about 55×25×4 mm in the 2.45 GHz band, in which the RF tag 30 is remotely started by the RF tag reader 40 operated in compliance with the ARIB STD-T66 standard apart from five meters, which is capable of reading and writing information in the RF tag 30.

The RF tag 30 is characterized in that the current consumption of the internal battery 31 is 0.1 microamperes or below as long as the RF tag 30 is not remotely started, which is almost the same as self-discharge of the internal battery 31. In addition, because a remote start command selectively starts only a particular RF tag 30 to begin communications, the RF tag 30 is suited for an application for real time read and write.

Because the received ASK demodulation circuit is passively operated, the internal battery is rarely consumed, and a current of 330 microamperes is consumed in the control circuit 35 only during response operations, command analysis, or write operations of information.

In the circuitry shown in FIG. 6, the antenna 32 is a divided microstrip antenna mounted with varactor diodes D11 and D12 for use both in reception and response, and the actual gain is about 4.5 dBi. RF power in the 2.45 GHz band from the RF tag reader is received between one terminal of the antenna 32 and a ground plane, and the voltage of the RF power is boosted in a tank circuit using a stub ($\lambda$g/4 short stub) 36 and a micro-capacitance condenser C11, and the RF power is rectified by a Schottky barrier diode D13 to charge a condenser C12.

Electric charges of the condenser C12 charges a condenser C13 through a Schottky barrier diode D14 to feed power to logic gate circuits U13, U14 and U15 and a pulse gate circuit (pulse code key detecting circuit 34).

A resistor R16 is inserted for the purpose of suppressing a voltage rise caused by the reverse leakage current of the Schottky barrier diode D14, and an output of the logic gate circuit U13 can take an ASK demodulated signal that is the signal received from the RF tag reader and is detected by the Schottky barrier diode D13.

The output of the logic gate circuit U13 is inputted to the pulse code key detecting circuit 34 to determine and output the presence of particular key code. The level of this determination output signal is converted by the logic gate circuit U14 and a resistor R14, and inputted to the logic gate circuit U11. Here, the logic gate circuits U14 and U15 are inverted logic circuits having open drain outputs. The power supply of the logic gate circuit U11 comes from the internal battery 31. When a determination output of the presence of the key is obtained from the pulse code key detecting circuit, the output of the logic gate circuit U11 is turned to high level to feed power to the control circuit 35. In the control circuit 35, once power is fed, the Pon output is turned to high level, in order to maintain power by itself, even though the determination output indicating the presence of the key is not available. A resistor R15 is inserted for the purpose of confirming the Pon output to low level, in the state in which no power is fed to the control circuit 35. In addition, the level of the received ASK demodulated signal that is the output of the logic gate circuit U13 is converted by the logic gate circuit U15 and a resistor R13, and the received ASK demodulated signal is connected to a Din of the control circuit 35, and received and analyzed by the control circuit 35. In the RF tag, relatively large reception power (−15 dBm or larger) is necessary for remote startup. Although the distance between the RF tag and the RF tag reader is limited within a few meters, the data transmission rate between the RF tag and the RF tag reader can be established faster.

In the RF tag once started, as similar to the scheduled start semi-passive RF tag, search for RF tag IDs and response operations to commands from the RF tag reader are conducted, and after finishing them, the RF tag turns the Pon output to low level by itself to stop power feed.

In addition, a resistor R11 shown in FIG. 6 applies the ground potential to the anode terminals of the varactor diodes D11 and D12 for the sub-carrier signal fs, and a resistor R12 applies the reverse bias voltage caused by the sub-carrier signal fs to the cathode terminals of the varactor diodes D11 and D12, whereby the resonance frequency of the antenna is changed, and reflected response waves are given with respect to transmission waves from the RF tag reader. In addition, because the output resistance of the internal battery 31 is relatively large, a condenser C15 is inserted for the purpose of suppressing changes in the power supply voltage of the logic gate circuit U11 caused by changes in the load current. In addition, because the determination output of the pulse code key detecting circuit 34 is the pulse output having a width of two microseconds, a Schottky barrier diode D15 and a condenser C14 store the power consumption from the start of the control circuit 35 to the output from the Pon in the condenser C14 for power feed.

In addition, when the RF tag 30 is too close to the RF tag reader 40, it is likely that the power supply voltage supplied to the logic gate circuit U13 to U15 and to the pulse code key detecting circuit 34 becomes excessively large.

Then, a resistor R17 is inserted between the cathode terminal of the Schottky barrier diode D13 and the anode terminal of the Schottky barrier diode D14, and a Zener diode D16 is inserted between the anode terminal of the Schottky barrier diode D14 and GND for overvoltage protection.

Figure 7:
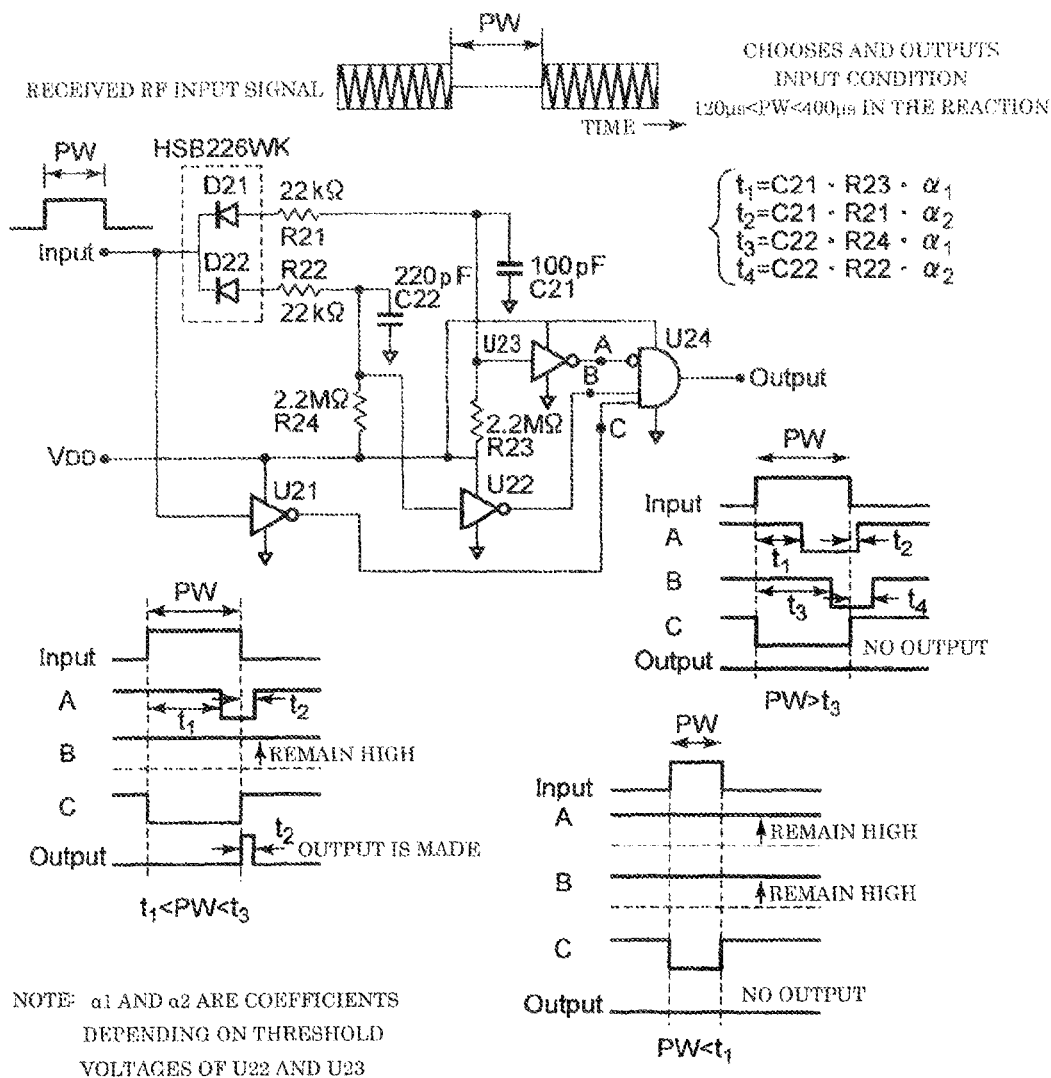
FIG. 7 shows an embodiment of the RF tag system according to the present invention, which is a circuit diagram depicting specific exemplary operation 1 of a pulse code key detecting unit for use in the remote start semi-passive RF tag.
Figure 8:
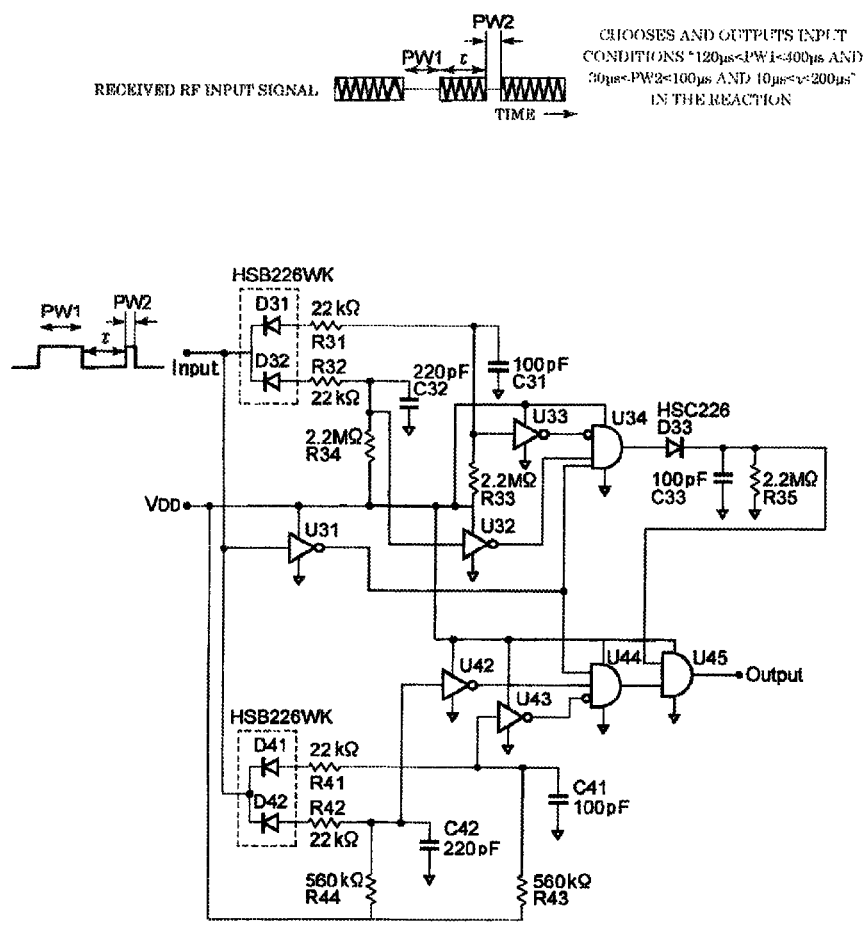
FIG. 8 shows an embodiment of the RF tag system according to the present invention, which is a circuit diagram depicting specific exemplary operation 2 of the pulse code key detecting unit for use in the remote start semi-passive RF tag.

Next, an specific exemplary circuit configuration and operation of the pulse code key detecting circuit 34 will be described with reference to FIG. 6. FIGS. 7 and 8 show an exemplary one pulse key detecting circuit and two pulse key detecting circuit.

The circuit shown in FIG. 7 is a circuit that takes output signals only under conditions where the pulse width PW is 120 microseconds<PW<400 microseconds, for the received RF signal of a negative logic ASK modulation pulse. Schottky barrier diodes D21 and D22 connected to an input are inserted for the purpose of discharging condensers C21 and C22 through resistors R21 and R22 when the Input terminal is at low level, and time constants t2 and t4 are implemented for the condensers C21 and C22, respectively. In addition, when the Input terminal is at high level, the condensers C21 and C22 are charged at time constants t1 and t3, respectively, through resistors R23 and R24. Here, pulse input response at points A, B, and C in the circuit is considered in three ways, PW>t3, t1<PW<t3, and PW<t1. As shown in FIG. 7, an output pulse signal can be obtained only in the case of t1<PW<t3, whereby it is revealed that a key can be detected for the pulse width PW.

In addition, in FIG. 7, it is determined whether the input pulse width is within a certain range by at least two sets of the condensers C21 and C22 as time constant circuits for charge and discharge formed, two sets of comparators U22 and U23 connected to the condensers C21 and C22, respectively, and a U24 that makes an AND of an input signal and outputs from two sets of the comparators U22 and U23. In addition, logical NOT circuits were used for the comparators U22 and U23.

FIG. 8 shows a circuit of the same connections, in which for the circuit shown in FIG. 7, the Schottky barrier diodes D21 and D22 correspond to Schottky barrier diodes D31 and D32 and Schottky barrier diodes D41 and D42, the resistor R21 to R24 correspond to resistors R31 to R34 and resistors R41 to R44, the condensers C21 and C22 correspond to condensers C31 and C32 and condensers C41 and C42, the logic gate circuit U21 corresponds to a logic gate circuit U31, and the logic gate circuits U22 to U24 correspond to logic gate circuits U32 to U34 and logic gate circuits U42 to U44. However, the resistor R43 and the resistor R44 have resistance values smaller than those of the resistors R23 and R24, and the charge time constants of the condensers C41 and C42 are one-fourth of those of the condensers C21 and C22.

Therefore, the output of the logic gate circuit U34 makes outputs only when the input pulse width PW1 is between 120 microseconds<PW1<400 microseconds, and the output of the logic gate circuit U44 makes outputs only when the input pulse width PW2 is between 30 microseconds<PW2<100 microseconds. The output of the logic gate circuit U34 charges the condenser C33 through the Schottky barrier diode D33, and holds high level for a time period $\tau = C33 \cdot R35 \cdot \alpha1$, when a positive logic pulse is once outputted from the logic gate circuit U34. Because the logic gate circuit U45 makes an AND with the PW2 detection output of the logic gate circuit U44, at this level, the key detection determination output is obtained only when PW2 is detected within the time $\tau$ after PW1 is detected.

Figure 9:
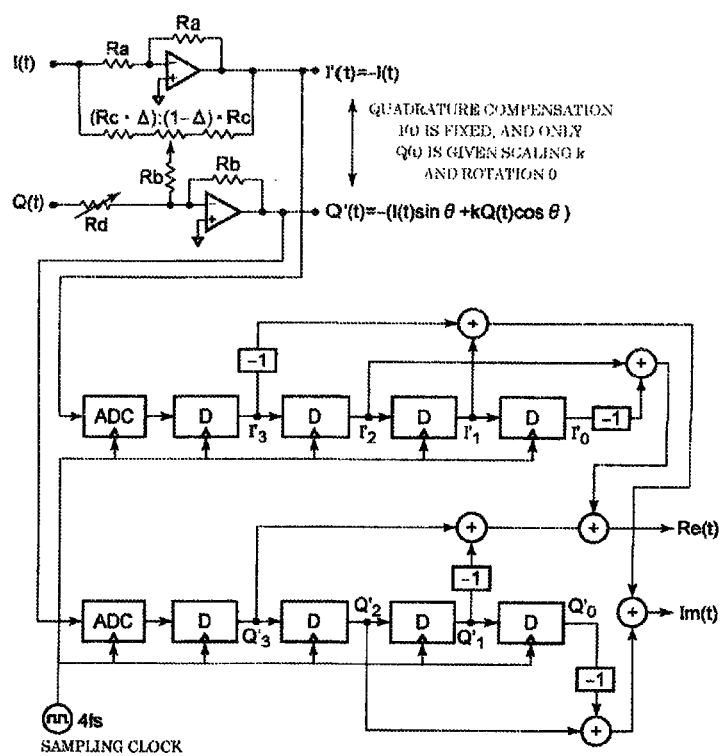
FIG. 9 shows an embodiment of the RF tag system according to the present invention, which is a circuit diagram depicting an exemplary compensation circuit for quadrature down-conversion and an exemplary complex DFT processing circuit for received sub-carrier fs signals of RF tag response in an RF tag reader shown in FIG. 3.
Figure 10:
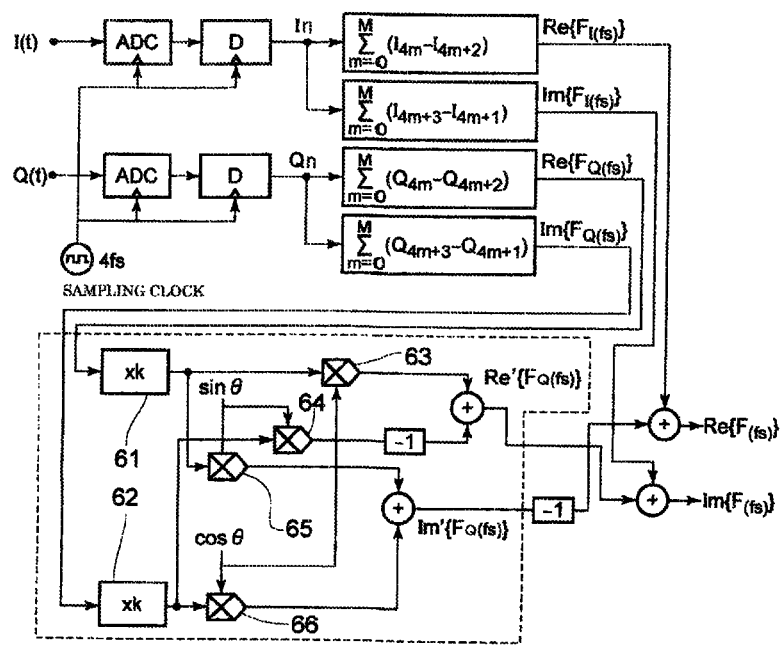
FIG. 10 shows an embodiment of the RF tag system according to the present invention, which is a circuit diagram depicting another exemplary compensation circuit for quadrature down-conversion and another exemplary complex DFT processing circuit for received sub-carrier fs signals of RF tag response in the RF tag reader shown in FIG. 3.

FIGS. 9 and 10 show examples of the compensation circuit for quadrature down-conversion in the RF tag reader according to the present invention shown in FIG. 3 and the complex DFT processing circuit for the received sub-carrier signal of fs RF tag response.

In the example shown in FIG. 9, the I and Q quadrature down-conversion signals are subjected to compensation in an analog manner at the frequency fs, while signals digitized in an ADC at 4fs sampling clocks are taken into shift registers D, the result of complex sliding DFT integration (Re(t)+jIm(t)) for each period of the signal fs is obtained by addition and subtraction processes. In the circuit shown in FIG. 9, the input signal I(t) is fixed, and only the signal Q(t) is given the scaling κ and the rotation θ.

Equation 1 expresses the scaling and rotation of the signal Q(t). The following is sufficient:

$Rd = Rb/(k \cdot \cos \theta)$, and $\Delta = (1 - \sin \theta)/2$

[Equation 1]

$Q'(t) = -(1(t)\sin \theta + kQ(t)\cos \theta)$   Equation 1

Equation 2 expresses the DFT output (Re(t)+jIm(t)) obtained from a Fourier integration process for a period of the signal fs for (I'(t)+jQ'(t)) after subjected to quadrature compensation.

[Equation 2]

$$F(fs, t) = \int_{t-1/fs}^{t} -(I'(\tau) + jQ'(\tau))\begin{pmatrix} \cos(2\pi fs\tau) - \\ j\sin(2\pi fs\tau) \end{pmatrix} dt \quad \text{Equation 2}$$
$$= I'_2 - I'_0 + Q'_3 - Q'_1 + j(-I'_3 + I'_1 + Q'_2 - Q'_0)$$
$$= R_e(t) + j I_m(t)$$

Because the output signal is a precise quadrature detection signal, the phase of the MPSK (M-ary phase shift keying) signal of RF tag response can be accurately demodulated to form data.

In the example shown in FIG. 10, while signals that the I and Q detection signals are digitized in an ADC at 4fs sampling clocks are taken, the signal I(t) and the signal Q(t) are subjected to complex DFT integration for every M period of the signal fs to obtain (Re{FI(fs)}+jIm{FI(fs)}) and (Re{FQ(fs)}+jIm{FQ(fs)}) by addition and subtraction processes. However, these outputs are values including quadrature detection error, which are not precise. The circuit surrounded by a dotted line shown in FIG. 10 is a circuit for digitally compensating error of quadrature detection, in which as shown in Equation 3, I(t) is fixed, and the Fourier transform of Q(t) can be given the scaling κ and the rotation θ.

In this circuit, although it is difficult to increase speed because there are many multiplications conducted by k-fold circuits 61 and 62 and arithmetic circuits 63 to 66, the computation process is conducted in every M periods of the signal fs, and this circuit can meet a relatively high frequency fs. In addition, the symbol "−1" in the drawing indicates a sign change arithmetic circuit.

[Equation 3]

[Equation 3]

$$R'_e\{FQ(fs)\} = k(R_e\{FQ(fs)\}\cos\Theta - I_m\{FQ(fs)\}\sin\Theta) \atop I'_m\{FQ(fs)\} = k(R_e\{FQ(fs)\}\sin\Theta + I_m\{FQ(fs)\}\cos\Theta) \quad \text{Equation 3}$$

Equation 4 expresses that the Fourier transform of the quadrature detection signal (I(t)+jQ(t)) is determined from the combination of the Fourier transform results of the I(t) signal and the signal Q(t). In the circuit shown in FIG. 10, instead of Re{FQ(fs)} and Im{FQ(fs)}, Re'{FQ(fs)} and Im'{FQ(fs)} subjected to quadrature compensation are used to obtain precise complex DFT output (Re{f(fs)}+jIm{F(fs)}) from F(fs)=Re{FI(fs)}−Im'{FQ(fs)}+j(Im{FI(fs)}+Re'{FQ(fs)}).

[Equation 4]

$$F(fs) = \int_0^T (I(t) + jQ(t))(\cos(2\pi fst) - j\sin(2\pi fst))dt \quad \text{Equation 4}$$
$$= R_e\{F1(fs)\} - I_m\{FQ(fs)\} + j(I_m\{FI(fs)\} + R_e\{FQ(fs)\})$$

This output signal is a precise quadrature detection signal, and is advantageous for modulating such a signal that the signal fs is constant and the transmission bit rate is slow. In other words, because the integration period M of the signal fs is increased to grow the signal-to-noise ratio, the reception sensitivity can be improved.

Other Embodiments

Figure 11:
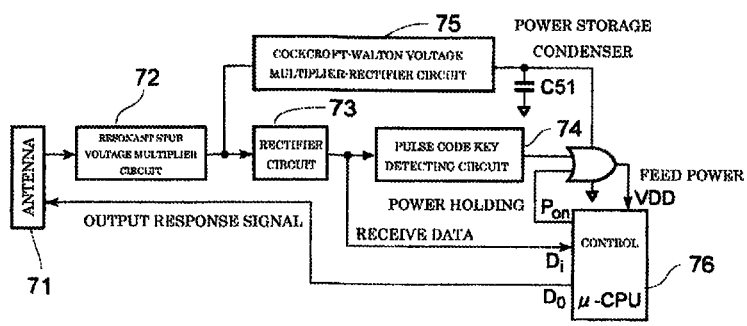
FIG. 11 shows an embodiment of the RF tag system according to the present invention, which is a circuit diagram depicting another embodiment of a remote start passive RF tag.

FIG. 11 shows another embodiment of the remote start passive RF tag, in which the voltage of a signal received from an antenna 71 is boosted by resonance in a resonant stub voltage multiplier circuit 72, and the signal is rectified in a rectifier circuit 73 to drive a pulse code key detecting circuit 74.

A Cockcroft-Walton voltage multiplier-rectifier circuit 75 (more specifically, see FIG. 1(B), for example) has a high output impedance, and can slowly store energy in a power storage condenser C51.

In addition, the output of the pulse code key detecting circuit 74 is turned to high level only when a pulse code key is included in the signal received from the antenna 71, and power stored in the power storage condenser C51 is supplied to a control circuit 76.

In other words, the pulse code key detecting circuit 74 detects the pulse code key to suppress unnecessary activation of the control circuit 76, whereby power storage in the passive RF tag can be conducted efficiently.

Figure 12:
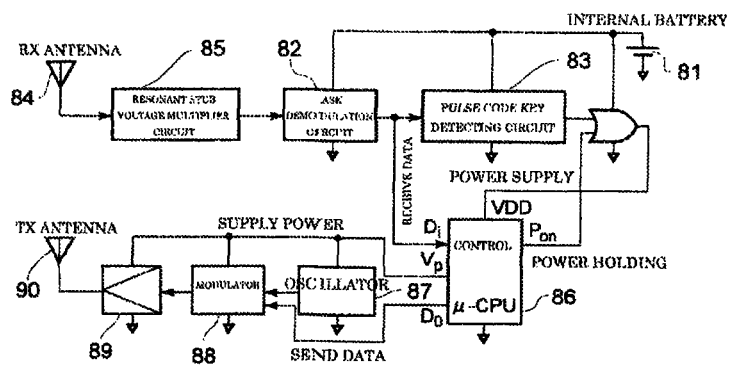
FIG. 12 shows an embodiment of the RF tag system according to the present invention, which is a circuit diagram depicting another embodiment of a remote start active RF tag.

FIG. 12 shows another embodiment of the remote start active RF tag, in which in the standby state, an internal battery 81 feeds power only to an ASK demodulation circuit 82 and to a pulse code key detecting circuit 83, and a pulse code key can be detected with high sensitivity.

In addition, only when a pulse code key is included in a received signal received by an Rx antenna 84, the output of the pulse code key detecting circuit 83 is turned to high level to feed the power of the internal battery 81 to the control circuit 86, received data is analyzed, Vp is turned to high level for output, and then data can be sent from a Tx antenna 90 through an oscillator 87, a modulator 88, and an amplifier 89.

In other words, while the active RF tag is highly sensitive, the active RF tag can make real time response as well as the power consumption of the internal battery 81 during standby time can be made relatively small to contribute to providing a long lifetime.

Figure 13:
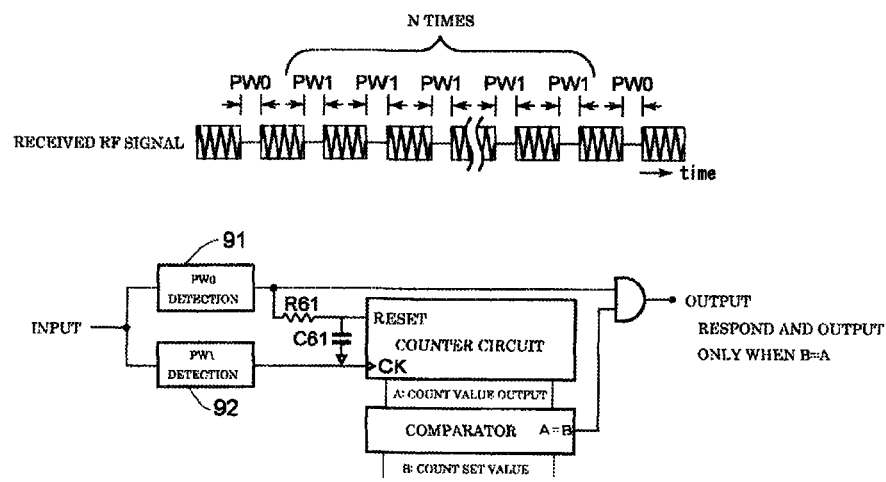
FIG. 13 shows an embodiment of the RF tag system according to the present invention, which is a circuit diagram depicting a pulse code key detecting circuit using a counter.

FIG. 13 shows a pulse code key detecting circuit using a counter, which outputs determination of detection only when N times of PW1, detected in a pulse width PW1 detecting circuit 92, are included between PW0 and PW0, detected in a pulse width PW0 detecting circuit 91. In addition, a resistor R61 and a condenser C61 configures a pulse delay circuit.

In addition, because the pulse code key detecting circuits shown in FIGS. 7, 8 and 13 can determine external power feed patterns from an external input signal having an electric power of a few μW as shown in FIG. 6, with no use of an additional power supply, for example, the RF tag using this circuit can be used as a receiver of a remote controller using radio waves as well as sound waves or light.

INDUSTRIAL APPLICABILITY

According to the present invention, an RF tag system can be provided, which allows high-speed data transmission from an RF tag to an RF tag reader.

The invention claimed is:

1. An RF tag system for conducting radio communications between an RF tag reader and an RF tag using radio waves in VHF band or above, wherein on the RF tag reader side, the RF tag reader sends a tag activating command including RF tag ID code of an RF tag on the other end of communications in ASK modulation mode, and then the RF tag reader sends a CW radio wave at a query carrier frequency fo, and on the RF tag side, the RF tag determines whether the RF tag ID code is matched with ID code of that RF tag, the RF tag analyzes the command for transmission in the ASK modulation mode, and the RF tag superimposes return information on a sub-carrier signal frequency-offset by a frequency fs in the MPSK modulation for transmission of the CW radio wave to reflect the radio wave, the RF tag system characterized in that:

in receiving a response signal from the RF tag on the RF tag reader side in transmission of the CW radio wave, an RF tag reader is used, wherein the RF tag reader includes:

means for quadrature detection and compensation that directly conducts quadrature detection by the query carrier frequency fo and then corrects detection error; and a generating circuit that samples signals at a frequency 4fs in order to obtain an MPSK demodulated signal from a detection signal.

* * * * *